US012377833B2

(12) United States Patent
Gorman

(10) Patent No.: US 12,377,833 B2
(45) Date of Patent: Aug. 5, 2025

(54) SYSTEMS AND METHODS FOR MANAGING A BATTERY CHARGE

(71) Applicant: Caterpillar Inc., Peoria, IL (US)

(72) Inventor: Corey Lee Gorman, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 331 days.

(21) Appl. No.: 18/182,940

(22) Filed: Mar. 13, 2023

(65) Prior Publication Data
US 2024/0308496 A1 Sep. 19, 2024

(51) Int. Cl.
*B60W 20/13* (2016.01)
*B60L 50/10* (2019.01)
*B60L 50/61* (2019.01)
*B60L 58/13* (2019.01)

(52) U.S. Cl.
CPC .............. *B60W 20/13* (2016.01); *B60L 50/10* (2019.02); *B60L 50/61* (2019.02); *B60L 58/13* (2019.02); *B60L 2200/40* (2013.01); *B60L 2240/549* (2013.01); *B60W 2510/244* (2013.01); *B60W 2530/18* (2013.01); *B60W 2556/10* (2020.02); *B60W 2710/244* (2013.01)

(58) Field of Classification Search
CPC .......... B60L 2200/40; B60L 2240/549; B60L 50/10; B60L 50/61; B60L 58/13; B60L 3/12; B60L 50/53; B60L 50/60; B60W 20/13; B60W 2510/244; B60W 2530/18; B60W 2556/10; B60W 2710/244; E02F 9/2091
See application file for complete search history.

(56) References Cited

U.S. PATENT DOCUMENTS

| 7,746,026 | B2 | 6/2010 | Koziara et al. |
| 8,403,101 | B2 | 3/2013 | Musser |
| 8,903,579 | B2 | 12/2014 | Treharne et al. |
| 9,296,302 | B2 | 3/2016 | Birke et al. |
| 10,124,697 | B2 | 11/2018 | Li |

(Continued)

FOREIGN PATENT DOCUMENTS

| EP | 3786371 | 3/2021 |
| WO | 2022153735 A1 | 7/2022 |

OTHER PUBLICATIONS

Written Opinion and International Search Report for Int'l. Patent Appln. No. PCT/US2024/014699 mailed May 8, 2024 (12 pgs).

*Primary Examiner* — Wade Miles
*Assistant Examiner* — Jerrod Irvin Davis

(57) ABSTRACT

Systems and methods for managing a battery charge of a work machine are described herein. The battery charge is maintained using a source of power (or other source) while the work machine also uses the source of power to power the work machine and the systems associated with the work machine. In instances in which the source of power may be removed for use by the work machine, a modification request may be used to change the battery from primary mode of operation, where the battery charge is maintained at a lower level to maintain the life of the battery, to a secondary mode of operation where the battery is charged to a high charge. The higher charge can be used to accommodate work machine operations while the battery is removed from the source of power. The battery can thereafter be returned to the primary mode of operation.

20 Claims, 3 Drawing Sheets

(56) References Cited

U.S. PATENT DOCUMENTS

2013/0311022 A1* 11/2013 Schmidt ............... B60W 20/00
                                                    903/903
2015/0217755 A1   8/2015 Bryan et al.
2025/0023377 A1*  1/2025 Albrektsson ........ H02J 7/00714

* cited by examiner

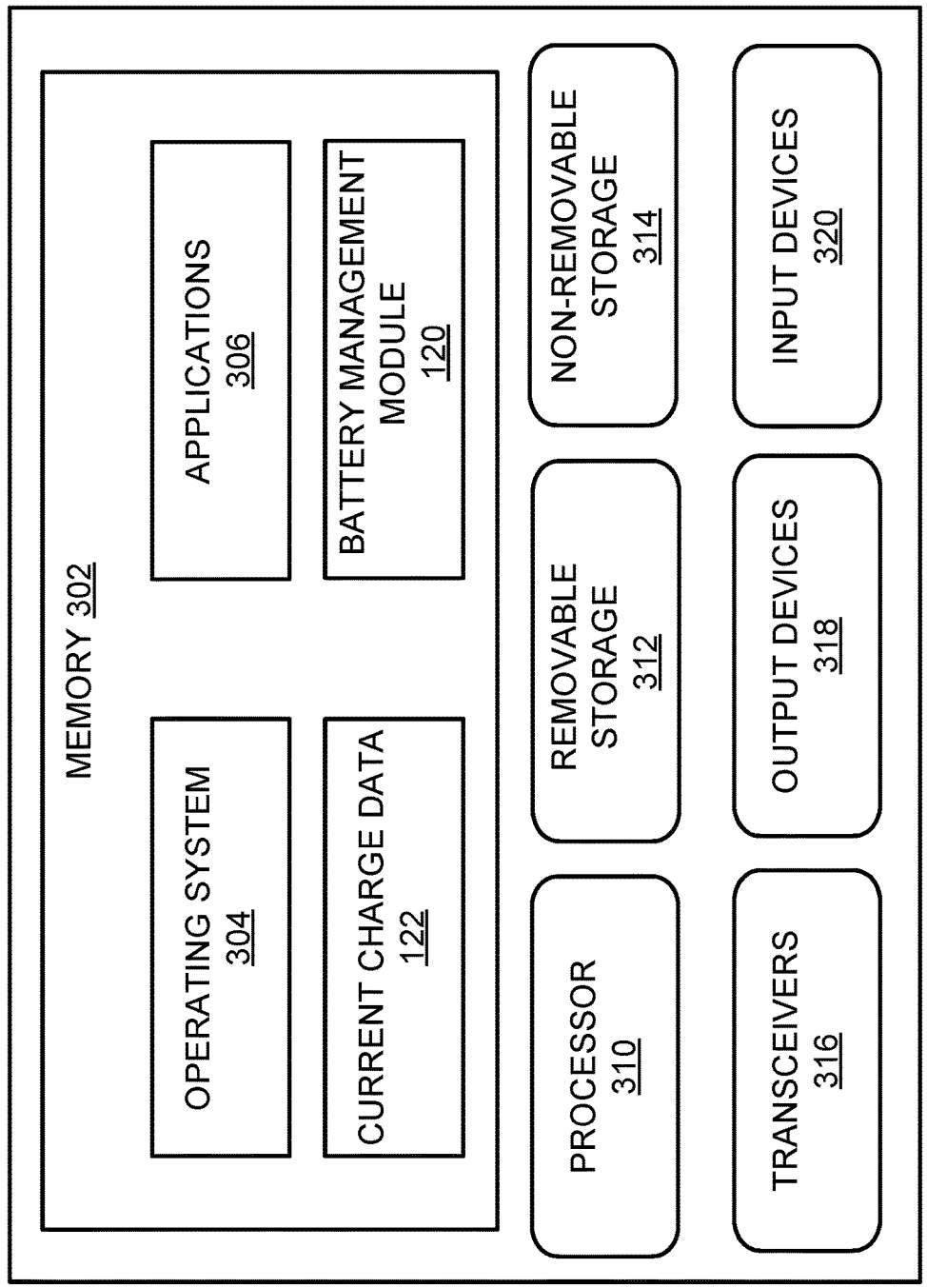

SYSTEMS AND METHODS FOR MANAGING A BATTERY CHARGE

TECHNICAL FIELD

The present disclosure relates to a system and method for managing a battery, and more particularly, for managing a battery charge in various modes based on an availability of electrical power through a tether.

BACKGROUND

Work machine types can vary according to use and location. For example, work machines can be excavators, haulers, diggers, pavers, and the like. Conventionally, the various machines are powered via an internal combustion power source (e.g., a prime mover consuming diesel fuel, natural gas, petroleum, etc.). With the increasing focus on sustainability, however, machines may additionally or alternatively include electrical power sources such as electrical power supplied through one or more tethers. A tether is an electrical conduit that electrically connects a power source to an electrical system of a work machine. The tethered electrical power can be provided by various sources. The work machine uses the power from the electrical power source to power various components such as motors, onboard computers, and the like.

When electrical power provided through a tether is not available, the work machine may switch over to the use of an onboard battery to supply the electrical power until the work machine reconnects to the electrical power source. Often, the batteries used in worksites and other locations by larger machines are relatively more expensive (e.g., on a per kilowatt energy available basis) than typical household or automobile batteries. These work machine batteries often output a significant amount of power to provide enough energy to move the work machine or operate its components. Because of the cost to purchase and replace such work machine batteries, it may be beneficial to control the battery charge and output of the battery so that the battery discharge and recharge cycles do not appreciably shorten the life of the battery. Managing an available amount of power from a battery when a source of electrical power is not available can extend the useable life of the battery.

One example of a battery charge system is described in U.S. Pat. No. 7,7460,026 to Koziara et. al. (hereinafter referred to "the '026 patent"). The '026 patent describes an electrical charging station for charging a vehicle at a charging station. The '026 patent describes an enhanced charge mode whereby a state of charge of the battery is increased at the charging station. A target for the state of charge is increased from a normal operating target to at least one enhanced mode target. However, the '026 patent is directed to a charging station used to charge a vehicle when the vehicle is parked, or the use of a combustion engine to charge the vehicle when the vehicle is moving. As such, the system described in the '026 patent is not configured to charge a vehicle that may not use an onboard generator to charge the vehicle while the while is in motion or, may need the vehicle to be parked if no onboard generator is present.

Examples of the present disclosure are directed toward overcoming one or more of the deficiencies noted above.

SUMMARY

In one aspect of the present disclosure, a control system for managing a battery in a work machine includes one or more processors, and one or more non-transitory computer-readable media storing computer-executable instructions that, when executed by the one or more processors, cause the one or more processors to perform acts comprising operating an electrical system of the work machine in a primary power mode in which electrical power from an electrical power source is used by the electrical system to operate the work machine and a charge of the battery is maintained between a first setpoint and a second setpoint, wherein the second setpoint is greater than the first setpoint, receiving a modification request to change an operation of the work machine from the primary power mode to a secondary power mode, in response to receiving the modification request, increasing an amount of electrical power to the battery to charge the battery to a third setpoint of the charge, wherein the third setpoint is greater than the second setpoint, and operating the electrical system in the secondary power mode, wherein the charge of the battery is maintained between the third setpoint and a fourth setpoint, wherein the fourth setpoint is less than the third setpoint.

In another aspect of the present disclosure, a method of battery management includes operating an electrical system of a work machine in a primary power mode, wherein when in the primary power mode, electrical power from an electrical power source is used by the electrical system to operate the work machine and a charge of the battery is maintained between a first setpoint and a second setpoint, wherein the second setpoint is greater than the first setpoint, receiving a modification request to change an operation of the work machine from the primary power mode to a secondary power mode, in response to receiving the modification request, increasing an amount of electrical power to the battery to charge the battery to a third setpoint of the charge, wherein the third setpoint is greater than the second setpoint, and operating the electrical system in the secondary power mode, wherein the charge of the battery is maintained between the third setpoint and a fourth setpoint, wherein the fourth setpoint is less than the third setpoint.

In a still further aspect of the present disclosure, a work machine includes a battery, and a control system to manage a charge of the battery, the control system comprising one or more processors, and one or more non-transitory computer-readable media storing computer-executable instructions that, when executed by the one or more processors, cause the one or more processors to perform acts comprising operating an electrical system in a primary power mode to use electrical power to operate the work machine, wherein a charge of the battery is maintained between a first setpoint and a second setpoint, the first setpoint being a low charge and a second setpoint being a high charge, receiving a modification request to change an operation of the work machine from the primary power mode to a secondary power mode, wherein the battery is charged to a third setpoint, the third setpoint being a higher charge than the second setpoint, increasing an amount of electrical power to the battery to charge the battery to the third setpoint, wherein the third setpoint is greater than the second setpoint, and maintaining the charge of the battery between the third setpoint and a fourth setpoint, wherein the fourth setpoint is less than the third setpoint while in the secondary power mode.

BRIEF DESCRIPTION OF THE DRAWINGS

The detailed description is described with reference to the accompanying figures. In the figures, the left-most digit or digits of a reference number identifies the figure in which the reference number first appears.

FIG. 3 depicts a component level view of a battery charge control system for use with the systems and methods described herein, in accordance with various examples of the presently disclosed subject matter.

DETAILED DESCRIPTION

Wherever possible, the same reference numbers will be used throughout the drawings to refer to the same or like parts.

Figure 1:
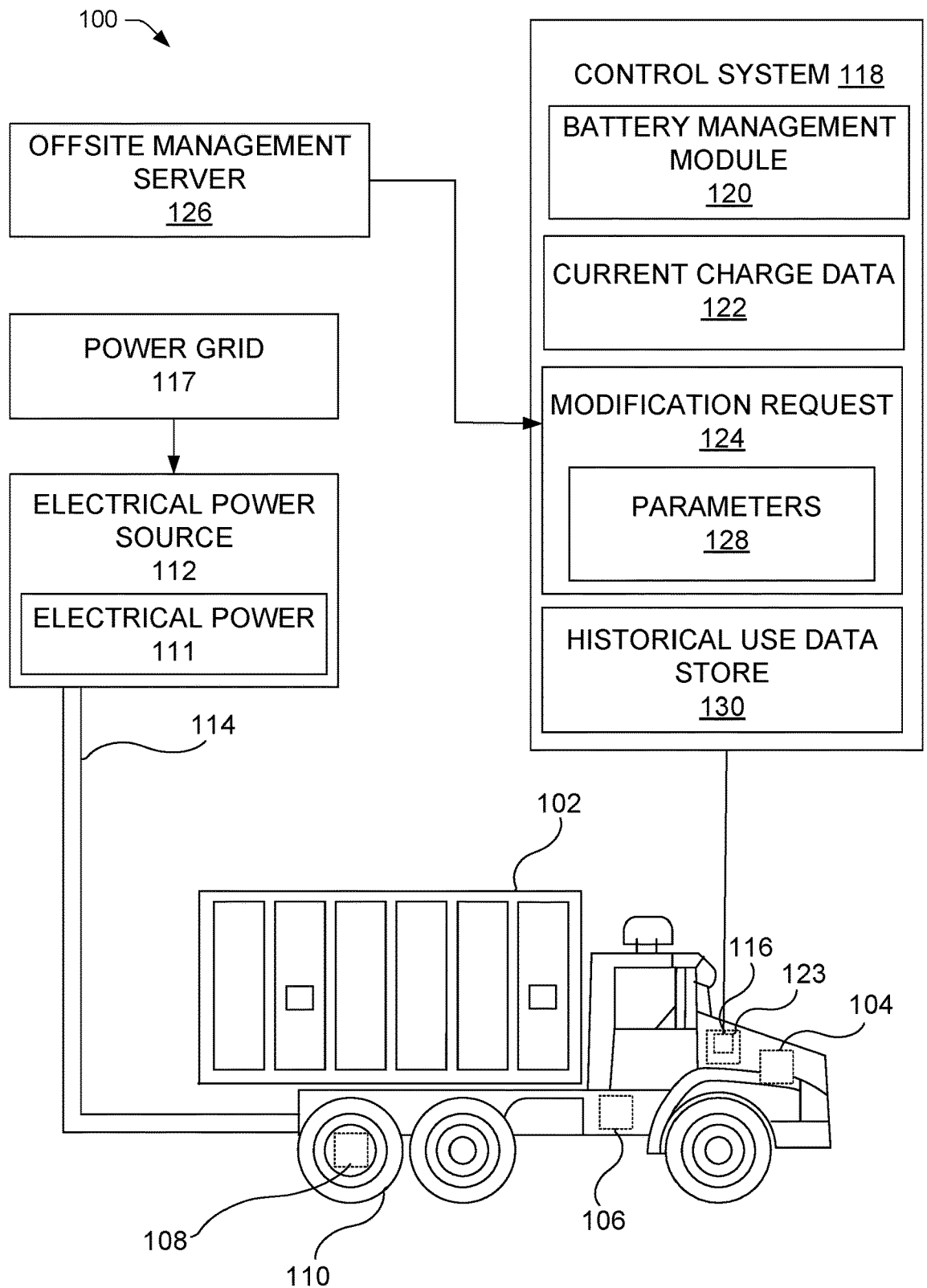
FIG. 1 illustrates an example worksite with a haul truck that uses electrical power, in accordance with various examples of the presently disclosed subject matter.

FIG. 1 illustrates, in schematic form, an example worksite 100 with a haul truck 102 that uses electrical power, in accordance with various examples of the presently disclosed subject matter. The haul truck 102 is a hybrid vehicle, meaning that the haul truck 102 and its various components can be powered by one or more prime movers including an internal combustion engine 104, a battery 106, a fuel cell, and/or other prime movers either alone or in combination. For example, when the haul truck 102 is powered by the internal combustion engine 104, the internal combusting engine 104 can power a generator (not shown) or other power generation component driven by the internal combustion engine 104 to provide electrical power to various components, such as an electric motor 108 that, when powered, rotates a wheel 110 to cause movement of the haul truck 102. The presently disclosed subject matter is not limited to any particular type of internal combustion engine 104.

In some examples, however, the haul truck 102 may operate exclusively using electrical power and may not include the internal combustion engine 104. In these examples, the haul truck 102 may be connected to an electrical power source 112 through one or more wires, cables, wireless charging units, or other type of tethers 114. The tether 114 can be comprised of one or more electrical power conduits having cabling capable of conducting current or supporting a voltage. The tether 114 can be any type of connector (or connection technology, including wireless charging) that is capable of directing (or conducting) electrical power 111 provided by the electrical power source 112 to the electrical system 116 of the haul truck 102. The electrical power source 112 can vary in type including, but not limited to, a generator, a solar array, a power station, or, as illustrated in FIG. 1, a node that receives power from an electrical power grid 117, such as one that may be provided by a power company. The electrical power 111 can be of various types, such as direct current (DC) and alternating current (AC) and may be characterized by various voltages. The presently disclosed subject matter is not limited to any particular power source or type.

The electrical power 111 is received by the electrical system 116 of the haul truck 102 through the tether 114. The electrical system 116 includes a control system 118, which in some configurations, is one or more computing systems capable of receiving one or more inputs and providing one or more outputs, as described by way of example in FIG. 3, below. The control system 118 is configured to control the distribution of the received electrical power 111 to the various components of the haul truck 102 depending on inputs received by an operator (not shown) of the haul truck 102. For example, the control system 118 routes a portion of the electrical power 111 to the electrical motor 108 to move the haul truck 102 when an input is received to perform that task. The control system 118 can further determine how much of the electrical power 111 received from the electrical power source 112 and/or the electrical power generated by the internal combustion engine 104 (if installed) is directed to charging the battery 106. It should be noted that although the control system 118 is illustrated and described as being a component of the haul truck 102, various functions of the control system 118 may be performed by computers remote from the haul truck 102.

As mentioned above, the charge of the battery 106 may be managed to extend the lifespan of the battery 106. For example, discharging the battery 106 to a low charge level (such as 5% of the total charge potential of the battery) and/or charging the battery to a high charge level (such as 90% of the total charge potential of the battery) one or more times can reduce the lifespan of the battery 106. Thus, the control system 118 includes a battery management module 120, which in some configurations, is one or more computing systems or modules capable of receiving one or more inputs and providing one or more outputs. The battery management module 120 monitors and controls the charge on the battery 106. The battery management module 120 receives current charge data 122 from a charge sensor 123 of the battery 106. The charge sensor 123, in some configurations, is a voltmeter that detects the charge of the battery 106 and outputs that charge as the current charge data 122 to the battery management module 120. During a first type of operation, e.g., normal or default operations, the battery management module 120 monitors the current charge data 122. If the charge of the battery 106 decreases to a first setpoint, the battery management module 120 instructs the control system 118 to increase the amount of power to the battery 106, thereby charging the battery 106. Similarly, if the charge of the battery 106 increases to a second setpoint, the battery management module 120 instructs the control system 118 to decrease the amount of power to the battery 106, thereby decreasing or stopping the charging of the battery 106. The first setpoint may be a charge percent of the battery above a low charge percentage setpoint and the second setpoint may be below a charge percent of the battery below a high charge setpoint. Maintaining the charge of the battery 106 between the first setpoint and the second setpoint is the manner in which the battery management module 120 operates the battery 106 in a normal, or primary power mode, operation. The normal operation may be configured to have the greatest effect on extending the lifespan of the battery 106.

However, in some instances, the battery 106 may need to be operated in a second type of operation, e.g., one that may require a high charge of the battery 106 to provide sufficient electrical power for a period of time. The high charge is achieved by entering into a secondary power mode of the battery 106. For example, the operator of the haul truck 102 may determine that the haul truck 102 is to be removed from the electrical power 111 provided through the tether 114. An example of this is when the haul truck 102 moves from one location to another, wherein the tether 114 needs to be disconnected in order for the haul truck 102 to make the trip. The haul truck 102 may be reattached to another tether at another location, or if at the same location, the haul truck 102 may be reattached to the tether 114. In another example, the operator may determine or be provided information that the electrical power 111 is not going to be available, such as a shutdown of the electrical power 111. Another example may be where the battery 106 is to be used to provide additional power whereby the current charge data 122 indicates that the battery 106 is not charged sufficiently to provide the power. The presently disclosed subject matter is not limited to any particular reason the battery 106 operation is to be modified from a normal operation to a high charge operation.

To change the battery 106 operation from a default operational charge to a high charge operation, the control system 118 receives a modification request 124. The modification request 124 may be a control input generated in response to actuation of a button, a touch screen input field, a knob, a lever, and/or other input controls of the haul truck 102 accessible by the operator. The modification request 124 may also be generated by an offsite management server 126 in response to actuation of a mouse, keyboard, touch screen input field, or other similar input device associated with the offsite management server 126. The offsite management server 126 may be a computing platform controlled by a central authority, like a worksite management office. In this example, the control system 118 (or a person) associated with the haul truck 102 may determine that the battery 106 is to switch modes of operation from a primary power mode to a secondary power mode to charge the battery sufficient for the high charge level or operation by receiving the modification request 124. In the primary power mode, the battery 106 is maintained between a first setpoint of a charge to a second setpoint of a charge, whereby the second setpoint is greater than the first setpoint. In the primary power mode, the charge of the battery 106 can be maintained in a range to extend the life of the battery 106, for example. In the secondary power mode, the battery 106 is charged to a higher level than the second setpoint. In the primary power mode, the electrical power is directed primarily to the operations of the haul truck, with an amount of the electrical power used to maintain the charge of the battery 106. In the secondary power mode, an increased amount of the electrical power received at the haul truck is provided to the battery 106 to charge the battery 106 to a higher charge than what is maintained during the primary power mode. Once the modification request 124 is received, the battery management module 120 instructs the control system 118 that the battery 106 is to enter the secondary power mode to achieve a high charge level for the battery, whereby the battery 106 is charged to a third setpoint that is greater than the second setpoint. The control system 118 then increases the amount of power delivered to the battery 106 to charge the battery 106 to the third setpoint, which is a high charge setpoint.

Once charged to the third setpoint, the battery management module 120 instructs the control system 118 to decrease the amount of power delivered to the battery 106. While in the high charge operation mode, the battery management module 120 monitors the current charge data 122. If the charge of the battery 106 decreases to a fourth setpoint, which may be above or below the second setpoint of the normal operation mode, and if the electrical power 111 is available, the battery management module 120 instructs the control system 118 to increase the amount of power delivered to the battery 106 to charge the battery 106 back to the third setpoint. If the electrical power 111 is not available and the current charge data 122 indicates that the charge of the battery 106 has decreased to a lower charge level, such as the second setpoint of the normal operation, the battery management module 120 may automatically remove the battery 106 from a high charge operation mode and operate the battery 106 in the normal operation mode.

In some examples, the modification request 124 may include parameters 128. The parameters 128 may include information such as the expected power load while in the high charge operation mode, the time the electrical power 111 may be unavailable, and the like. The battery management module 120 receives the parameters 128 and accesses a historical use data store 130. The historical use data store 130 includes information about the battery 106 that can be used to determine the third setpoint for the high charge operation mode. For example, the historical use data store 130 can include information about discharge rates of the battery 106 at one or more charge levels of the battery 106, discharge rates of the battery for specific operations of the haul truck 102, and the like. When the battery management module 120 receives the parameters 128, the battery management module 120 can use the information stored in the historical use data store 130 to determine the charge that the battery 106 is to receive for the high charge operation mode (e.g., the third setpoint). In some examples, the parameters 128 can include charging information relating to other work machines that may affect the charging of the battery 106. For example, the haul truck 102 may be one of several work machines using the electrical power 111 provided by the electrical power source 112. The parameters 128 may include information that the haul truck 102 is going to lose access to the electrical power 111, but also that other work machines are going to lose access as well. Thus, the parameters 128 may include information to cause the battery management module 120 to request a higher charge rate from the control system 118. For example, a default charge rate of the battery 106 may be preferential to decrease the effect of the charging operation on the battery 106.

However, if the battery 106 needs to be charged faster, the battery management module 120 instructs the control system 118 to charge the battery at a second, higher rate of charging in order to achieve the third setpoint of the battery 106 charge faster. This increased rate of charge may allow the haul truck 102 to disconnect itself from the electrical power 111 faster, thus allowing other work machines to charge and/or charge at a faster rate. The charge rate parameter 128 may also be used to prioritize the charging of the haul truck 102. For example, if the haul truck 102 is the last to be disconnected from the electrical power 111, it may be preferable to charge the battery 106 at a first rate while allowing other work machine(s) using the same electrical power 111 to charge at a higher rate. Once those other work machine(s) are charged to a desired level, the parameters 128 may indicate that the battery management module 120 is to instruct the control system 118 to charge at a second, higher rate of charge. The parameters 128 may be used to determine the mode of operation of the battery 106, as well as the charging rate of the battery 106, described in more detail in FIG. 2, below.

Figure 2:
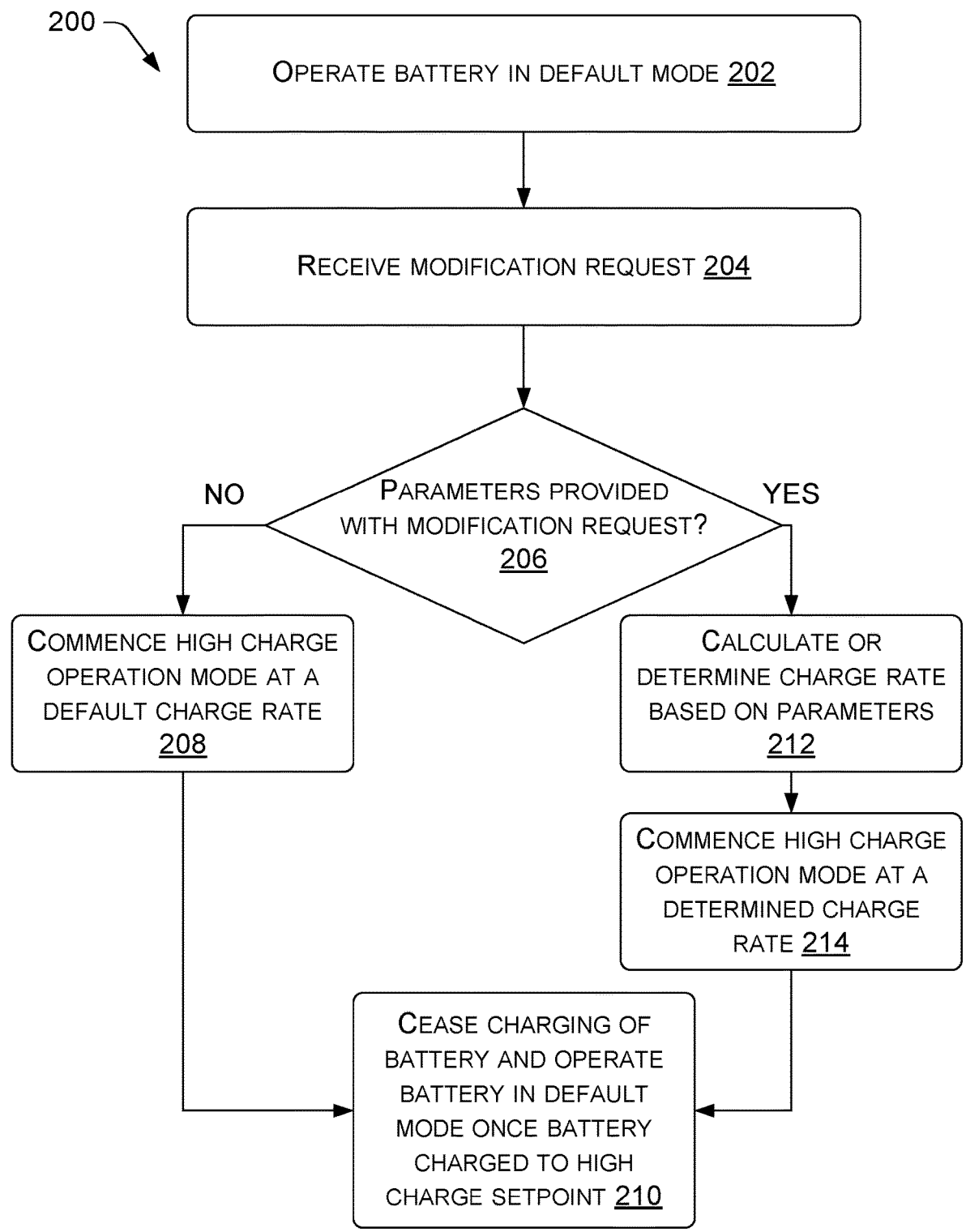
FIG. 2 illustrates an example method for managing a charge of a battery, in accordance with various examples of the presently disclosed subject matter.

FIG. 2 illustrates a method 200 for managing a charge of the battery 106, in accordance with various examples described herein. The method 200 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. The processes illustrated herein may be performed by any of the processors/controllers described herein, but for ease of description, the control system 118 will be referred to unless otherwise noted.

The method 200 commences at step 202, where the control system 118 is operating the battery 106 in a normal (primary power) mode using the battery management module 120. In the normal mode, the control system 118 manages the amount of the electrical power 111 applied to the battery 106 to charge the battery 106. In some examples, to extend the lifespan of the battery 106, the normal mode may include a low charge potential of around thirty percent (30%) and a high charge potential of around 60 percent (60%). It should be noted that these setpoints may vary depending on the particular battery. During the normal mode, the charge of the battery 106 is maintained between the low charge potential and the high charge potential.

At step 204, the control system 118 receives a modification request 124. The modification request 124 may be a control input received from the operator. The modification request 124 may also be an input received from an offsite management server 126. The offsite management server 126 may be a computing platform controlled by a central authority, like a worksite management office. The modification request 124 may result from various factors, such as an expected or anticipated loss of the electrical power 111. In another example, the haul truck 102 may be moved from one location to another, wherein the tether 114 needs to be disconnected in order for the haul truck 102 to make the trip. In another example, the operator may determine or be provided information that the electrical power 111 is not going to be available. Another example may be where the battery 106 is to be used to provide additional power whereby the current charge data 122 indicates that the battery 106 is not charged sufficiently to provide the power. The presently disclosed subject matter is not limited to any particular reason for the modification request 124.

At step 206, the control system 118 determines if one or more parameters 128 are included or received with the modification request 124. In some examples, the modification request 124 is an input that changes the operation from the primary power mode to the secondary power. The parameters 128, if received, are used to provide additional information to the control system 118, such as why the modification request 124 was received, a potential amount of power the battery will need to provide, and the like. The parameters 128 may be additional data that the control system 118 uses to determine a charge rate of the battery 106. The parameters 128 may include information such as the expected power load (i.e., how much energy will be required of the battery 106) while in the high charge operation mode, the time the electrical power 111 may be unavailable (i.e., the battery is to be untethered from the electrical power source), and the like.

If at step 206 the control system 118 determines that the modification request 124 does not include one or more parameters 128 (step 206—No), at step 208, the control system 118 causes the battery 106 to be operated in a high charge operation mode, whereby the battery 106 is charged to a potential higher than the normal operation mode. The control system 118 causes the battery 106 to be charged at a default rate.

At step 210, the battery 106 is charged to the high charge operation mode setpoint and the control system 118 ceases the charging of the battery. The control system 118 thereafter places the battery 106 back in the normal or default mode of operation. In some examples, the control system 118 may maintain the battery 106 in the high charge operation mode until a condition is met, such as the loss of the electrical power 111.

If at step 206 the control system 118 determines that the modification request 124 does include one or more parameters 128 (step 206—Yes), at step 212, the control system 118 calculates a charge rate based on the parameters 128 and a minimum or required charge of the battery 106 that may be needed to meet the requirements provided in the parameters 128. For example, the parameters 128 may include the distance or time the haul truck 102 has to travel. The parameters 128 may include information such as the expected power load while in the high charge operation mode, the time the electrical power 111 may be unavailable, and the like. As part of the calculation, the battery management module 120 can also access the historical use data store 130 to determine battery charges needed for the same or similar parameters 128. The historical use data store 130 includes battery data about the battery 106 that can be used to determine the third setpoint for the high charge operation mode. For example, the historical use data store 130 can include information about discharge rates of the battery for a battery charge, discharge rates of the battery for specific operations of the haul truck 102, and the like.

At step 214, the control system 118 commences charging of the battery 106 based on the charge rate determined at step 212. At step 210, the battery 106 is charged to the high charge operation mode setpoint and the control system 118 ceases charging of the battery. The control system 118 thereafter places the battery 106 back in the normal (or default) mode of operation. In some examples, the control system 118 may maintain the battery 106 in the high charge operation mode until a condition is met, such as the loss of the electrical power 111.

FIG. 3 depicts a component level view of the control system 118 for use with the systems and methods described herein. The control system 118 could be any device capable of providing the functionality associated with the systems and methods described herein. The control system 118 can comprise several components to execute the above-mentioned functions. The control system 118 may be comprised of hardware, software, or various combinations thereof. As discussed below, the control system 118 can comprise memory 302 including an operating system (OS) 304 and one or more standard applications 306. The standard applications 306 may include applications that provide for receiving and determining battery information, such as the current charge data 122, that are used to implement the method 200 of FIG. 2. The memory 302 can also include other applications such as the battery management module 120.

The control system 118 can also comprise one or more processors 310 and one or more of removable storage 312, non-removable storage 314, transceiver(s) 316, output device(s) 318, and input device(s) 320. In various implementations, the memory 302 can be volatile (such as random access memory (RAM)), non-volatile (such as read only memory (ROM), flash memory, etc.), or some combination of the two. The memory 302 can include data pertaining to the battery 106, such as the historical use data store 130.

The memory 302 can also include the OS 304. The OS 304 varies depending on the manufacturer of the control system 118. The OS 304 contains the modules and software that support basic functions of the control system 118, such as scheduling tasks, executing applications, and controlling peripherals. The OS 304 can also enable the control system 118 to send and retrieve other data and perform other functions, such as transmitting control signals using the transceivers 316 and/or output devices 318 and receiving load conditions using the input devices 320.

The control system 118 one or more processors 310 can be one or more central processing units (CPUs), graphics processing units (GPUs), both CPU and GPU, or any other combinations and numbers of processing units. The control system 118 may also include additional data storage devices (removable and/or non-removable) such as, for example, magnetic disks, optical disks, or tape. Such additional storage is illustrated in FIG. 3 by removable storage 312 and non-removable storage 314.

Non-transitory computer-readable media may include volatile and nonvolatile, removable and non-removable tangible, physical media implemented in technology for storage of information, such as computer readable instructions, data structures, program modules, or other data. The memory 302, removable storage 312, and non-removable storage 314 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the control system 118. Any such non-transitory computer-readable media may be part of the control system 118 or may be a separate database, databank, remote server, or cloud-based server.

In some implementations, the transceiver(s) 316 include any transceivers known in the art. In some examples, the transceiver(s) 316 can include wireless modem(s) to facilitate wireless connectivity with other components (e.g., between the control system 118 and a wireless modem that is a gateway to the Internet), the Internet, and/or an intranet. Specifically, the transceiver(s) 316 can include one or more transceivers that can enable the control system 118 to send and receive data, such as the modification request 124 from the haul truck 102 or the offsite management server 126. Thus, the transceiver(s) 316 can include multiple single-channel transceivers or a multi-frequency, multi-channel transceiver to enable the control system 118 to send and receive video calls, audio calls, messaging, etc. The transceiver(s) 316 can enable the control system 118 to connect to multiple networks including, but not limited to 2G, 3G, 4G, 5G, and Wi-Fi networks. The transceiver(s) 316 can also include one or more transceivers to enable the control system 118 to connect to future (e.g., 6G) networks, Internet-of-Things (IoT), machine-to machine (M2M), and other current and future networks.

The transceiver(s) 316 may also include one or more radio transceivers that perform the function of transmitting and receiving radio frequency communications via an antenna (e.g., Wi-Fi or Bluetooth®). In other examples, the transceiver(s) 316 may include wired communication components, such as a wired modem or Ethernet port, for communicating via one or more wired networks. The transceiver(s) 316 can enable the control system 118 to facilitate audio and video calls, download files, access web applications, and provide other communications associated with the systems and methods, described above.

In some implementations, the output device(s) 318 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 318 can also include speakers, or similar devices, to play sounds or ringtones when an audio call or video call is received. Output device(s) 318 can also include ports for one or more peripheral devices, such as headphones, peripheral speakers, or a peripheral display.

In various implementations, input device(s) 320 include any input devices known in the art. For example, the input device(s) 320 may include a camera, a microphone, or a keyboard/keypad. In some examples, the input device(s) can include an interface an operator uses to generate the modification request 124. The input device(s) 320 can include a touch-sensitive display or a keyboard to enable users to enter data and make requests and receive responses via web applications (e.g., in a web browser), make audio and video calls, and use the standard applications 306, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 320 and an output device 318.

INDUSTRIAL APPLICATION

The present disclosure describes managing a battery 106 based on an availability of electrical power. To extend the lifespan of the battery 106, it can be preferable to maintain the charge of the battery 106 within a band that minimizes the effect of a complete discharge and a full charge. The battery 106 can be kept on a "trickle" charge, e.g., a normal mode of operation, while a work machine, such as the haul truck 102 of FIG. 1 is connected to an electrical power source 112 via the tether 114. However, in situations in which a loss of the electrical power 111 is expected, or the battery 106 will be used to a degree that the current charge does not provide, the battery 106 may be placed in a high charge operation mode. In the high charge operation mode, the battery 106 is charged to a potential above the normal mode of operation. The control system 118 can determine a charge rate based on various parameters 128 received in conjunction with the modification request 124. Using the methods and technologies described herein can provide for an increased lifespan of the battery 106, while also providing sufficient electrical power from the battery 106 should the need arise.

Although the systems and methods are discussed in the context of a haul truck 102, the systems and methods discussed herein may be applied to a wide array of machines and vehicles across a wide variety of industries, such as construction, mining, farming, transportation, military, combinations thereof, or the like. For example, the system or methods discussed herein may be implemented within any vehicle, machine, or equipment with wheels, such as a combine.

While the foregoing invention is described with respect to the specific examples, the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, the claims are not necessarily limited to the specific features or acts described. Rather, the specific features and acts are merely illustrative some embodiments that fall within the scope of the claims of the application.

The invention claimed is:

1. A control system for managing a battery in a work machine, the system comprising:
one or more processors; and
one or more non-transitory computer-readable media storing computer-executable instructions that, when executed by the one or more processors, cause the one or more processors to perform acts comprising:
operating an electrical system of the work machine in a primary power mode in which electrical power from an electrical power source is used by the electrical system to operate the work machine and a charge of the battery is maintained between a first setpoint and a second setpoint, wherein the second setpoint is greater than the first setpoint;
receiving a modification request to change an operation of the work machine from the primary power mode to a secondary power mode;
in response to receiving the modification request, increasing an amount of electrical power to the battery to charge the battery to a third setpoint of the charge, wherein the third setpoint is greater than the second setpoint; and
operating the electrical system in the secondary power mode, wherein the charge of the battery is maintained between the third setpoint and a fourth setpoint, wherein the fourth setpoint is less than the third setpoint.

2. The control system of claim 1, wherein the acts further comprise:
calculating a charge rate associated with the battery based on a parameter associated with the modification request and the charge of the battery when the modification request is received; and
increasing the amount of electrical power to the battery to charge the battery at the charge rate.

3. The control system of claim 2, wherein calculating the charge rate comprises accessing a historical use data store based on the parameter to retrieve an amount of battery charge required to meet the parameter, wherein the parameter is a time or distance of travel of the work machine required for the battery to be a source of power for the work machine.

4. The control system of claim 3, wherein the historical use data store comprises battery data of a discharge rate of the battery when at the charge of the battery when the modification request is received and the parameter.

5. The control system of claim 3, wherein the acts further comprising:
receiving a second parameter;
calculating a second charge rate based on a second parameter; and
charging the battery at the second charge rate.

6. The control system of claim 1, wherein the acts further comprise:
receiving a second modification request to operate the work machine in the primary power mode; and
ceasing a maintenance of the charge of the battery within the third setpoint and the fourth setpoint; and
maintaining the charge of the battery within the first setpoint and the second setpoint.

7. The control system of claim 6, wherein the second modification request is received pursuant to an input that the work machine is reconnected to the electrical power source or a second electrical power source.

8. A method of battery management, comprising:
operating an electrical system of a work machine in a primary power mode, wherein when in the primary power mode, electrical power from an electrical power source is used by the electrical system to operate the work machine and a charge of the battery is maintained between a first setpoint and a second setpoint, wherein the second setpoint is greater than the first setpoint;
receiving a modification request to change an operation of the work machine from the primary power mode to a secondary power mode;
in response to receiving the modification request, increasing an amount of electrical power to the battery to charge the battery to a third setpoint of the charge, wherein the third setpoint is greater than the second setpoint; and
operating the electrical system in the secondary power mode, wherein the charge of the battery is maintained between the third setpoint and a fourth setpoint, wherein the fourth setpoint is less than the third setpoint.

9. The method of claim 8, further comprising:
calculating a charge rate associated with the battery based on a parameter associated with the modification request and the charge of the battery when the modification request is received; and
wherein increasing the amount of electrical power to the battery to charge the battery is based upon the charge rate calculated.

10. The method of claim 9, further comprising accessing a historical use data store based on the parameter to retrieve an amount of battery charge required to meet the parameter, wherein the parameter is a time or distance of travel of the work machine required for the battery to be a source of power for the work machine.

11. The method of claim 10, wherein the historical use data store further comprises a discharge rate of the battery when at the charge of the battery when the modification request is received and the parameter.

12. The method of claim 11 further comprising:
receiving a second parameter;
calculating a second charge rate based on a second parameter; and
charging the battery at the second charge rate.

13. The method of claim 8, further comprising:
receiving a second modification request to operate the work machine in the primary power mode; and
ceasing a maintenance of the charge of the battery within the third setpoint and the fourth setpoint; and
maintaining the charge of the battery within the first setpoint and the second setpoint.

14. The method of claim 13, wherein the second modification request is received pursuant to an input that the work machine is reconnected to the electrical power source or a second electrical power source.

15. A work machine, comprising:
a battery; and
a control system to manage a charge of the battery, the control system comprising:
one or more processors; and
one or more non-transitory computer-readable media storing computer-executable instructions that, when executed by the one or more processors, cause the one or more processors to perform acts comprising:

operating an electrical system in a primary power mode to use electrical power to operate the work machine, wherein a charge of the battery is maintained between a first setpoint and a second setpoint, the first setpoint being a low charge and the second setpoint being a high charge;

receiving a modification request to change an operation of the work machine from the primary power mode to a secondary power mode, wherein the battery is charged to a third setpoint, the third setpoint being a higher charge than the second setpoint;

increasing an amount of electrical power to the battery to charge the battery to the third setpoint, wherein the third setpoint is greater than the second setpoint; and maintaining the charge of the battery between the third setpoint and a fourth setpoint, wherein the fourth setpoint is less than the third setpoint while in the secondary power mode.

16. The work machine of claim 15, the acts further comprising:

calculating a charge rate associated with the battery based on a parameter associated with the modification request and the charge of the battery when the modification request is received;

and wherein increasing the amount of electrical power to the battery to charge the battery is based upon the charge rate calculated.

17. The work machine of claim 16, wherein the act of calculating a charge comprises accessing a historical use data store based on the parameter to retrieve the charge required to meet the parameter, wherein the parameter is a time or distance of travel of the work machine required for the battery to be a source of power for the work machine.

18. The work machine of claim 17, wherein the historical use data store comprises battery data of a discharge rate of the battery when at the charge of the battery when the modification request is received and the parameter.

19. The work machine of claim 18, wherein the battery data further comprises a discharge rate of the battery for an operation.

20. The work machine of claim 16, the acts further comprising:

calculating a second charge rate based on the parameter; and charging the battery at the second charge rate.

* * * * *